(12) United States Patent
Walker

(10) Patent No.: US 6,765,208 B1
(45) Date of Patent: Jul. 20, 2004

(54) THERMOLUMINESCENCE DOSIMETERS WITH NARROW BANDPASS FILTERS

(75) Inventor: Scottie W. Walker, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 107 days.

(21) Appl. No.: 09/954,839

(22) Filed: Sep. 17, 2001

(51) Int. Cl.$^7$ ............................................... G01T 1/11
(52) U.S. Cl. ....................................................... 250/337
(58) Field of Search .......................................... 250/337

(56) References Cited

U.S. PATENT DOCUMENTS

| | | | | |
|---|---|---|---|---|
| 3,484,605 | A | * 12/1969 | Attix ........................... | 250/337 |
| 3,800,142 | A | * 3/1974 | Harshaw, II ................. | 250/337 |
| 5,354,997 | A | * 10/1994 | Miller ......................... | 250/337 |
| 5,572,027 | A | * 11/1996 | Tawil et al. ................. | 250/337 |
| 5,606,163 | A | * 2/1997 | Huston et al. .............. | 250/337 |

OTHER PUBLICATIONS

T.F.L. Daltro, et al., "Thermoluminescence Dosemeter for Equivalent Dose Assessment in Mixed Beta and Gamma Field", *Radiation Protection Dosimetry* 85:1–4, pp. 145–148 (1999).

M. Moscovitch, et al., "Mixed Field Personnel Dosimetry Using a Nearly Tissue–Equivalent Multi–Element Thermoluminescence Dosemeter", *Radiation Protection Dosimetry* 34:1/4, pp. 145–148 (1990).

M. Moscovitch, "Personnel Dosimetry Using LiF:Mg,Cu, P", *Radiation Protection Dosimetry* 85:1–4, pp. 49–56 (1999).

O.R. Perry, et al., "LiF;Mg, Cu,P Based Environmental Dosemeter and Dose Calculation Algorithm", *Radiation Protection Dosimetry* 85:1–4, pp. 273–281 (1999).

K.J. Velbeck, et al.,, "Next Generation Model 8800 Automatic TLD Reader", *Radiation Protection Dosimetry* 84:1–4, pp. 381–386 (1999).

\* cited by examiner

*Primary Examiner*—Constantine Hannaher
(74) *Attorney, Agent, or Firm*—George H. Libman

(57) ABSTRACT

A dosimetry method exposes more than one thermoluminescence crystals to radiation without using conventional filters, and reads the energy stored in the crystals by converting the energy to light in a conventional manner, and then filters each crystal output in a different portion of the spectrum generated by the crystals.

12 Claims, 1 Drawing Sheet

THERMOLUMINESCENCE DOSIMETERS WITH NARROW BANDPASS FILTERS

GOVERNMENT RIGHTS

The Government has rights to this invention pursuant to Contract No. DE-AC04-94AL85000 awarded by the U.S. Department of Energy.

BACKGROUND OF THE INVENTION

1. Field of the Invention (Technical Field)

The present invention relates to thermoluminescence dosimeters (TLDs) for radiation dosimetry.

2. Background Art

Current dosimetry methods employ TLDs that have materials such as copper, Mylar®, tin, and/or plastics to filter the radiation energy. See, e.g., M. Moscovitch, et al., "Mixed Field Personnel Dosimetry Using a Nearly Tissue-Equivalent Multi-Element Thermoluminescence Dosemeter", Radiation Protection Dosimetry 34:1/4, pp. 145–148 (1990): and T.F.L. Daltro, et al., "Thermoluminescence Dosemeter for Equivalent Dose Assessment in Mixed Beta and Gamma Field", Radiation Protection Dosimetry 85:1–4, pp. 145–148 (1999). This radiation filition causes varying degrees of energy to be absorbed by the TLD material underneath the filter(s). These dosimeters are processed using machines such as the Model 8800PC reader manufactured by Bicron/NE of Solon, Ohio. K. J. Velbeck, et al., "Next Generation Model 8800 Automatic TLD Reader", Radiation Protection Dosimetry 84:1–4, pp. 381–386 (1999). Dose calculation algorithms attempt to determine radiation type and energy based solely on the ratios of light output without regard to the light wavelength. See, e.g., E. W. Bradley, et al., "Harshaw Dose Calculation Algorithm", Sandia National Laboratories Report (1994). Daltro, et al., supra, and Moscovitch, et al., supra. Additionally, the use of radiation filters creates an angular dependence problem that results in an underestimation of the dose equivalent when a worker is not directly facing the radiation source. L. F, Friedman, et al., "Angular Dependence of the Harshaw 8800/8812 TLD System", Sandia National Laboratories Report (1991).

TLDs operate in the following manner. Electrons within a material normally exist at an energy level known as the valence band. Through some outside physical processes, such as heating or, in the present case, a radiation event, these electrons can be excited into another region known as the conduction band. The electrons are free to move around in the conduction band, but they will always attempt to return to their ground state. Since energy must be conserved in such a transition, the crystal emits light photons that escape the material. The light is the medium that is used to create the correlation between absorbed energy and dose equivalent for an individual. However, once the light is emitted, all information about the radiation event(s) is lost. Therefore, a method must be used to trap the electron(s) in place until the dosimeter is ready to be processed.

Between the valence and conduction bands exists an area known as the forbidden region. Electrons in a material cannot exist in this region unless they are trapped there by an impurity when they attempt to return to their ground state. After being trapped, return to ground then occurs when the TLD reader heats the TLD with hot nitrogen gas, which causes the emission of photons of particular wavelengths. For dosimetry purposes, these impurities are purposely added to the TLD crystal and are referred to as dopants. For example, the present dosimeter employed by Sandia National Laboratories uses LiF that is doped with magnesium and titanium to create electron capture sites within a forbidden energy region of the crystal. For LiF:Mg,Ti, this region exists between 2.076–3.550 eV and will correspond to a light wavelength emission of 350–600 nm during dosimeter processing by the reader. Since current methods use the entire wavelength of light from the LiF, they depend totally on the dose calculation algorithm to make determinations about radiation type and energy.

A TLD crystal using LiF doped with magnesium, copper, and phosphorus (LiF:Mg,Cu,P) has recently been developed that appears to provide higher sensitivity than TLDs using Li:Mg,Ti. M. Moscovitch, "Personnel Dosimetry Using LiF:Mg,Cu,P", Radiation Protection Dosimetry 85:1–4, pp. 49–56 (1999); O. R. Perry. et al., "LiF:Mg.Cu,P Based Environmental Dosemeter and Dose Calculation Algorithm", Radiation Protection Dosimetry 85:1–4, pp. 273–281 (1999). The device and method of the invention is equally applicable to these and all other present and future TLD crystal materials.

The present invention provides an improved thermoluminescence dosimetry method, TLD, and TLD lens drawer that allows dosimeters to more accurately determine what type of radiation and energy an individual or physical environment has been exposed to during a monitoring period. And, having the knowledge of these conditions, he or she will also be able to more accurately calculate the dose equivalent received by the worker or environment.

SUMMARY OF THE INVENTION
(DISCLOSURE OF THE INVENTION)

The present invention is of an improvement to existing thermoluminescence devices comprising a sensitive element comprising one or more thermoluminescence crystals, the improvement comprising a lens drawer comprising one or more bandpass filters. The bandpass filters are preferably equal in number to the crystals (such as four) and comprise lenses.

The invention is also of a thermoluminescence device lens drawer comprising one or more bandpass filters. In the preferred embodiment, the bandpass filters are equal in number to a number of thermoluminescence crystals of a corresponding thermoluminescence device (such as four. The bandpass filters preferably comprise lenses.

The invention is additionally of a thermoluminescence dosimetry method comprising: heating one or more thermoluminescence crystals; passing light from the one or more crystals through one or more bandpass filters; and detecting light passed through the one or more bandpass filters. In the preferred embodiment, the bandpass filters are located in a thermoluminescence device lens drawer are equal in number to the crystals (such as four), and comprise lenses.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DESCRIPTION OF THE PREFERRED EMBODIMENTS (BEST MODES FOR CARRYING OUT THE INVENTION)

The present invention is of an improved dosimetry method, TLD lens drawer, and thermoluminescence dosimeter (TLD), such as those employing the lithium-fluoride (LiF) crystals (chips) discussed above. Such TLDs are processed by a TLD reader such as the Model 8800 PC hot nitrogen gas reader described above. In the present invention, light output from the dosimeters is screened using bandpass filters and processed using the normal reader functionality to establish a plurality (preferably four) of discrete ranges of light wavelengths, such as four non-overlapping ranges in the range of 350–600 nanometers for LiF TLDs. The amount and ratios of the various light wavelengths are then correlated to radiation type and energy. Based on knowledge of the incident radiation type and energy, a dose calculation is then be made using an appropriate dose calculation algorithm, as understood and readily developable by one of ordinary skill in the art.

The present invention is technically different from current methods for calculating doses because the TLD (such as LiF) crystal itself already possesses the necessary information regarding the radiation energy, radiation type, and penetrability. It is this crucial information that is lost during processing using current means. The present invention establishes the radiation type and energy using the relationship $$\lambda = \frac{hc}{E},$$

where $\lambda$ is the wavelength of the light emission, h is Planck's constant, c is the speed of light, and E is the energy of the emitted light photon. Since E is directly related to the depth of the electron trap within the dosimeter crystal, knowledge of the wavelength of the light emission will yield knowledge of the incident radiation type and energy that can be directly related to dose depth in human tissue. With the present invention, this determination can be done without the expensive and cumbersome filters inherent to current dosimeters, significantly reducing if not eliminating altogether the angular dependence problem.

The present invention results in a profound improvement in the dose calculations that are performed for radiological workers. The improvement results not only from the method used to determine the radiation type and energy, but also from a reduction in the angular dependence that is so prevalent in current dosimeter designs. The present invention also results in significant cost savings for dosimeters because they no longer require elaborate holders with various filter combinations that cost anywhere from $8–$12 apiece.

Figure 1:
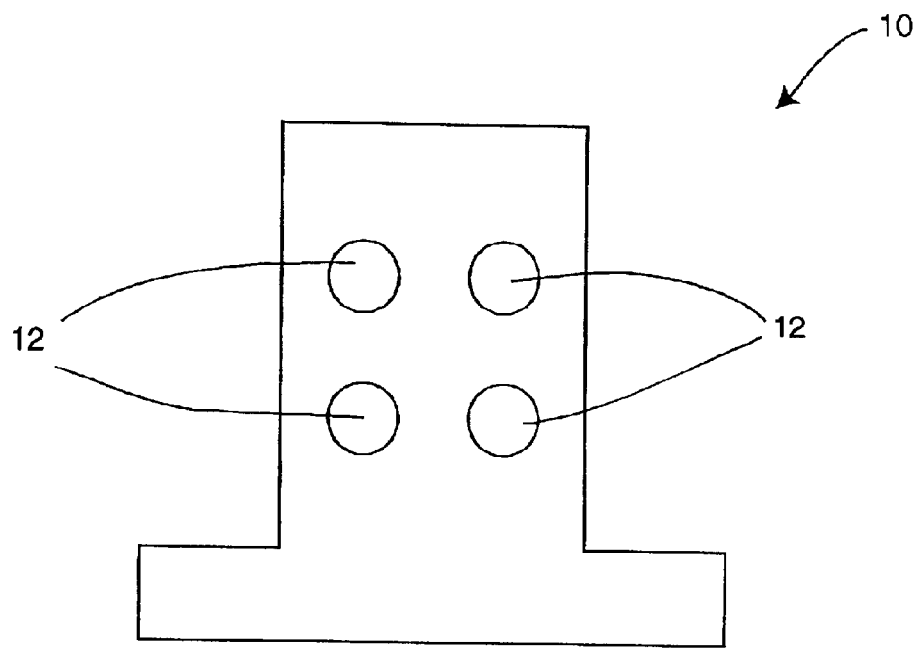
FIG. 1 is a top view of the preferred TLD lens drawer of the invention.

FIG. 1 illustrates in top view the preferred embodiment of the improved lens drawer 10 of the invention which is incorporated into prior art TLDs. In the prior art, the lens drawer comprises one or more (such as four) clear lenses that pass all light wavelengths but provide physical protection of the photomultiplier tubes of the TLD reader from environmental degradation, such as from deposits of foreign matter previously deposited on the TLD. In the invention, the lens drawer comprises one or more (such as four) bandpass filters 12 (preferably lenses) that each allow only predetermined wavelengths to pass from the TLD crystal beneath. Each bandpass filter filters a wavelength range that may or may not overlap that of the other bandpass filters. The range width of each bandpass filter can be between, for example, approximately 25 nm and 100 nm.

Figure 2:
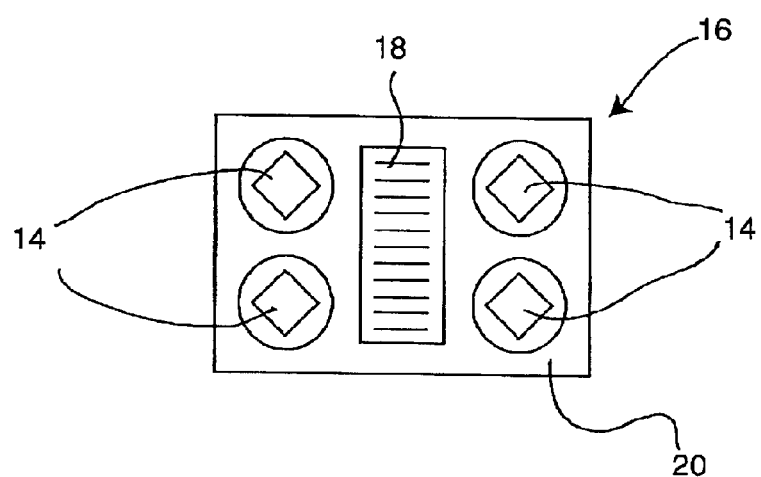
FIG. 2 is a top view of the sensitive element of a TLD (prior art).

FIG. 2 illustrates the sensitive element 16 of a TLD (prior art), comprising one or more TLD crystals 14 (typically encapsulated in Teflon®) which correspond in number to the number of lenses in the lens drawer, identification barcode 18, and aluminum card 20. The present invention does not alter the design of the sensitive element of the TLD, although thicknesses, materials, and doping of the TLD crystals can be altered to take advantage of the wavelength filtration provided by the improved lens drawer of the invention.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A thermoluminescence dosimetry (TLD) method comprising the steps of:
    exposing more than one similar TLD crystals to a radiation source; and
    reading the radiation dose by the steps of:
        heating the TLD crystals to cause the emission of light from each crystal over a frequency band that is determined by properties of the crystals;
        filtering light from each through a different portion the frequency band; and
        detecting the filtered light from each crystal.
2. The method of claim 1 wherein the filtering step comprises passing the light from each crystal through a bandpass filters, each filter passing light from only one crystal.

3. The method of claim 2 wherein there are four crystals and four bandpass filters.

4. The method of claim 3 wherein bandpass filters comprise lenses.

5. The method of claim 4 further comprising determining dose calculation from the detected light from each crystal.

6. The method of claim 3 wherein the pass band for each filter is at least 10% and no more than 40% of the frequency band of the crystal.

7. The method of claim 1 further comprising determining dose calculation from the light detected from each crystal.

8. The method of claim 1 wherein the exposing step comprises having equal filtration between each crystal and the radiation source.

9. The method of claim 8 wherein there is no filtration between each crystal and the radiation source.

10. The method of claim 9 wherein the filtering step comprises passing the light from each crystal through a bandpass filter, each filter passing light from only one crystal.

11. The method of claim 10 wherein there are four crystals and four bandpass filters.

12. The method of claim 11 further comprising determining dose calculation from the detected light from each crystal.

* * * * *